(12) United States Patent
Ko

(10) Patent No.: US 6,882,725 B2
(45) Date of Patent: Apr. 19, 2005

(54) METHOD AND APPARATUS FOR CONNECTING TO IP PRIVATE BRANCH EXCHANGE

(75) Inventor: Sung kyun Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 10/166,662

(22) Filed: Jun. 12, 2002

(65) Prior Publication Data
US 2002/0191773 A1 Dec. 19, 2002

(30) Foreign Application Priority Data
Jun. 13, 2001 (KR) .................... 10-2001-0033247

(51) Int. Cl.⁷ .................................... H04M 3/00
(52) U.S. Cl. ...................... 379/265.09; 379/225
(58) Field of Search ............ 379/265.09, 266.09, 379/225

(56) References Cited

U.S. PATENT DOCUMENTS 5,179,627 A * 1/1993 Sweet et al. .............. 704/200
5,764,639 A * 6/1998 Staples et al. ............ 370/401
6,704,411 B1 * 3/2004 Nishidate ............... 379/265.09

* cited by examiner

Primary Examiner—Ahmad F. Matar
Assistant Examiner—Rasha Al-Aubaidi
(74) Attorney, Agent, or Firm—Fleshner & Kim, LLP

(57) ABSTRACT

A method and apparatus for connecting a manager terminal to an IP PBX system includes receiving a link request signal from the manager terminal via a connection line, switching the link request signal to a central control unit if the link request signal includes appropriate identification information, and activating a predetermined protocol to provide an Internet environment to the manager terminal in response to the link request signal. The connection line between the manager terminal and the IP PBX system is preferably either a single line telephone (SLT) network or an SLT line connected to a public switched telephone network (PSTN). The identification information in the line request signal may be a telephone number from which the manager terminal is communicating or another telephone number. A password authentication procedure may also be implemented to confirm the identify of the manager who sent the link request signal. Through this method and apparatus, a manager may establish a connection to the IP PBX system to control that system using a management program regardless of the manager's location and without the use of a local area network. This results in significant cost savings and convenience to the manager and IP PBX system owner.

26 Claims, 2 Drawing Sheets

METHOD AND APPARATUS FOR CONNECTING TO IP PRIVATE BRANCH EXCHANGE

BACKGROUND OF THE INVENTION

1. Field of the Invention

The present invention relates to an IP PBX (Private Branch eXchange), and more particularly, to an IP PBX connecting method which allows an operator to connect to the IP PBX regardless of the operator's location.

2. Background of the Related Art

Well known to those skilled in the art, a PBX is an exchange system which allows not only personnel in, for example, an office or business to share a predetermined number of external telephone lines but also allows those users to be connected to internal extensions which are automatically switched. A main object of using a PBX system is to save cost which would otherwise be consumed if all users were allocated with public telephone lines. In general, unlike the public telephone lines which are owned by telephone companies, a PBX system is owned by a business entity under its responsibility. In general, a PBX system includes telephone trunk lines, a computer (requiring a self-memory) used for exchanging and managing calls inside and outside the PBX, a line network in the PBX, and a console or switchboard for an operator.

Recently, an IP PBX system has been introduced which not only functions as a conventional PBX but also serves as a gateway to the Internet for performing audio and switching functions without an additional exchange. This is accomplished by associating an Internet telephone or Internet search function with a general analog exchange. With this system, subscribers can have telephone conversations via telephones or computers, and can also enjoy web surfing via the Internet. IP PBX systems have therefore proven useful in maximizing convenience of the user and cost savings to the system owner.

In general, the conventional PBX is a closed system which is subordinate to a selling company's activities. For example, owners of conventional PBX systems must incur a cost every time a switching modification is made in the system. Further, additional purchase costs are incurred when providing a separate Internet solution in the office. On the contrary, the IP PBX has various functions such as office/extension conversation, office/extension switching, automatic call distribution, voice mailbox, automatic voice guidance, facsimile, automatic voice recognition guide and group calling functions. On a comparative basis, it is therefore simpler to operate the PBX system since the IP PBX has a system management program which is embodied in a Graphic User Interface (GUI) environment.

The management program for operating a IP PBX system is commonly known as an Operation Maintenance Subsystem (OMS). In general, the OMS program is installed in a terminal such as a computer connected to the IP PBX. This allows the manager to simply operate the IP PBX in a window environment via a web environment. In this case, management of the IP PBX is accomplished using software, hardware and various resources of the IP PBX, such as change and modification of trouble diagnosis data.

Conventionally, in order to operate the IP PBX, the manager connects between his/her terminal (e.g., computer) to the IP PBX via a LAN, operates the OMS program installed in the terminal, and then manages and operates the IP PBX in the web environment. As is well known in the art, "LAN" means a network in a local or narrow area, and is generally used for communication among terminals existing in a company or a specific area.

FIG. 1 illustrates the structure of a general IP PBX system. As shown, the IP PBX system comprises an IP PBX 60, user terminals 10, 20 and 30 for requesting the IP PBX 60 for conversation via a Public Switched Telephone Network (PSTN) 50, a Single Line Telephone (SLT) network and/or a LAN and a computer 40 having an OMS program for managing and controlling the IP PBX 60. The IP PBX 60 connects conversation requests received from the user terminals 10, 20 and 30 to external networks, and conversely, connects conversation requests from external networks to corresponding terminals 10, 20 and 30. Examples of the user terminals 10, 20 and 30 may include a telephone, facsimile, a computer and the like according to their functions.

Typically, the manager computer 40 is connected to the IP PBX 60 via the LAN. Therefore, in order to manage the IP PBX 60, a manager at computer 40 may use the OMS program to connect to the IP PBX 60 via the LAN to carry out operations such as trouble diagnosis and data amendment.

Conventional IP PBX systems have been shown to have several drawbacks. For example, in these systems, it is impossible to operate or manage the IP PBX in an area or environment without the LAN, since the manager computer is connected to the IP PBX via the LAN. As an illustration, consider the case where the manager visits L.A. for a longterm business trip with an IP PBX located in New York. Using the conventional system, the manager cannot operate the IP PBX since a LAN is not connected between New York and L.A. And even if a LAN is installed to connect between the manager and the IP PBX, when the manager tries to connect to the manager computer via the LAN in order to operate the IP PBX of individual buildings or his/her company, at least one fire wall installed in buildings and/or the company blocks the manager from operating the IP PBX.

Further, although the LAN is installed in an area far away from the IP PBX which the manager wants to operate and the OMS program is installed in any computer available for the manager in L.A., the manager using the computer cannot connect to the IP PBX via the LAN since the LAN is restricted to the area where the manager is located, e.g., L.A.

SUMMARY OF THE INVENTION

An object of the invention is to solve at least the above problems and/or disadvantages and to provide at least the advantages described hereinafter.

Accordingly, one object of the present invention is to provide a method and apparatus for connecting a manager terminal to an IP PBX system regardless of the manager's location.

It is another object of the present invention to achieve the aforementioned object by allowing the manager to connect to the IP PBX via an SLT line or a PSTN.

These and other objects and advantages of the invention are achieved by providing an IP PBX connecting method which includes: receiving a link request signal from the manager terminal via a connection line; switching the link request signal to provide the same to a central control unit; and activating a PPP protocol to provide an Internet environment to the manager terminal in response to the link request signal. Preferably, the link request signal has a unique identifier which is matched to a pre-stored identifier prior to making the connection. The connection line is preferably a household SLT line or an SLT line connected to a PSTN.

The step of switching the link request signal may include: confirming whether the link request signal has a unique identifier which is identical with an identifier prearranged in an IP PBX; and if the unique identifier which is identical with the identifier prearranged in the IP PBX, providing the link request signal to the central control unit via a modem.

According to another aspect of the invention, an IP PBX connecting method includes: transferring a link request signal from the manager terminal to the IP PBX system via an SLT line; confirming a source of the link request signal; if the source of the link request signal is the manager terminal, switching the link request signal via a corresponding output port; providing the link request signal outputted via the corresponding output port to a central control unit via a modem; and activating by the central control unit a PPP protocol to provide an Internet environment to the manager terminal in response to the link request signal. The source of the link request signal maybe confirmed by judging whether the link request signal has a unique identifier which is identical with a prearranged identifier.

According to further another aspect of the invention, an IP PBX connecting method includes: transferring a link request signal having a unique identifier to the IP PBX via a PSTN; confirming a source of the link request signal; if the source of the link request signal is the manager terminal, switching the link request signal into a corresponding output port; providing the link request signal outputted via the corresponding output port to a central control unit via a modem; and activating by the central control unit a PPP protocol to provide an Internet environment to the manager terminal in response to the link request signal. The PSTN my be connected to the manager terminal via an SLT line.

According to still another aspect of the invention, an IP PBX connecting apparatus includes means for receiving a link request signal from the manager terminal via a connection line; means for switching the link request signal into a central control unit; and control means for activating a PPP protocol to provide an Internet environment to the manager terminal in response to the link request signal. The receiving means may be an SLT interface module or an office interface module. The switching means switches the link request signal into a corresponding port according to judgment whether a unique identifier of the link request signal is identical with a prearranged identifier.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a preferred embodiment of the invention in reference to the accompanying drawings.

Figure 1:
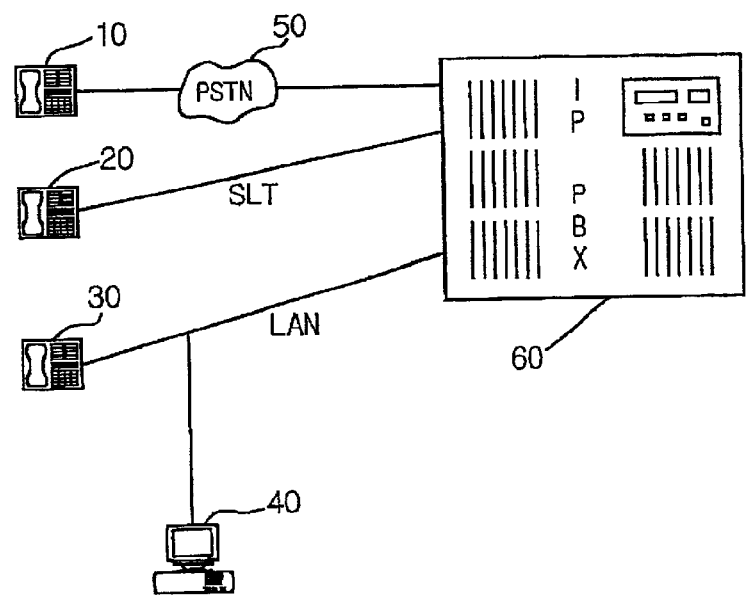
FIG. 1 illustrates a structure of a general IP PBX system.
Figure 2:
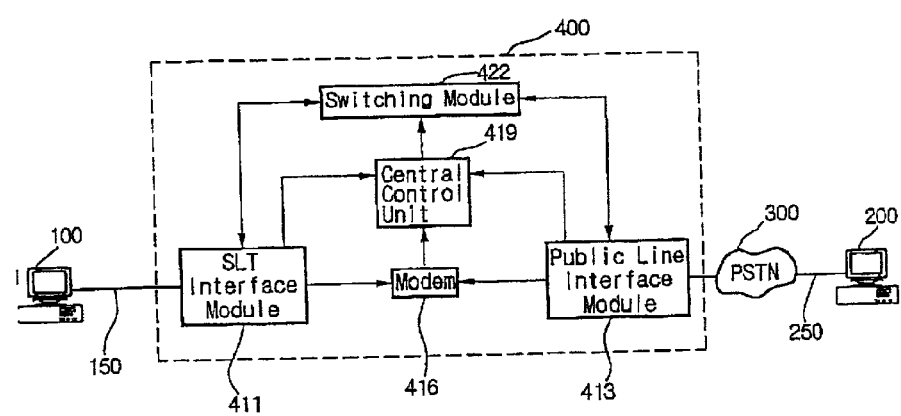
FIG. 2 illustrates a structure of an IP PBX connecting apparatus according to a preferred embodiment of the invention.

FIG. 2 illustrates the structure of an IP PBX connecting apparatus according to a preferred embodiment of the invention, in which conventional IP PBX system connecting apparatuses via a LAN are omitted from the drawing in order to clarify the invention as well as simplify the description as shown in FIG. 2. It is apparent to those skilled in the art that the IP PBX system can be also connected via the LAN according to the invention. Referring to FIG. 2, the IP PBX connecting apparatus comprises an IP PBX 400 and manager terminals 100 and 200 which are respectively connected to the IP PBX 400 via SLT lines 150 and 250. The IP PBX 400 provides a manager with an Internet environment in response to a link request of the manager terminals 100 and 200 so that the manager may operate the IP PBX 400. Each of the manager terminals 100 and 200 is installed with an OMS program for managing the IP PBX via the Internet link request. At least one of manager terminal 100 and 200 also has an external or internal modem for supporting Internet communication enabled via any of the SLT lines 150 and 250. The manager terminals 100 and 200 may be or include any one of a computer, a notebook computer, a laptop computer, or the like.

The SLT lines 150 and 250 are preferably general telephone lines, and/or mean communication lines for enabling telephone communication to take place with a counterpart via a PSTN 300 or other network. When any of the manager terminals 100 and 200 generates a link request signal, the link request signal can be respectively transferred through the SLT line 150, or the SLT line 250 and the PSTN 300, connected to the SLT line leading to the IP PBX 400. As will be described in greater detail below, the manager terminal 100 or 200 transmits the link request signal into the IP PBX 400 under control of the OMS program, and an initial page is provided to the terminal if the IP PBX 400 approves a link through authentication.

The IP PBX 400 comprises an SLT interface module 411, a public line interface module 413, a modem 416, a switching module 422 and a central control unit 419. Preferably, the IP PBX 400 is provided with a telephone number which is prearranged for judging a unique telephone number corresponding to the link request signal from the manager terminal 100 or 200.

The SLT interface module 411 recognizes the link request signal received via the SLT line 150 from the manager terminal 100, and reports the link request signal to the central control unit 419.

The public line interface module 413 recognizes the link request signal received through the SLT line 250 via the PSTN 300 from the manager terminal 200, and reports the link request signal to the central control unit 419.

Preferably, each of the SLT interface module 411 and the public line interface module 413 includes an exclusive output port for transferring the link request signal into the modem 416. The output port may be exclusively used for outputting a signal into the modem 416 only if the signal is the link request signal for managing the IP PBX. Therefore, each of the SLT interface module 411 and the public line interface module 413 transfers the link request signal into the modem 416 via the output port under the control of the central control unit 419.

The switching module 422 switches the link request signal into the output port under the control of the central control unit 419. The SLT interface module 411 or the office interface module 413 receives innumerable communication request signals, in which the switching module 422 selects the link request signal for operating the IP PBX 400 from the communication request signals, and switches the selected link request signal into the output port.

The modem 416 converts the link request signal received in the SLT interface module 411 or the public line interface module 413 via a modem in the manager terminal 100 or 200, so that the link request signal may be compatible with the central control unit 419. The modem 416 converts the link request signal, e.g., PCM data, received via the output port into serial data recognizable by the central control unit 419. When received via the LAN, the link request signal is directly inputted into the central control unit 419 so that the next procedure may be executed. However, when the SLT lines and the like are used, the link request signal is received from the modem in the manager terminal. In this case, the modem 416 is required in order to allow the central control unit 419 to recognize the link request signal.

The central control unit 419 controls the IP PBX 400. More specifically, upon receiving the link request signal from the SLT interface module 411 or the office interface module 413, the central control unit 419 loads and compares the prearranged telephone number with the unique telephone number corresponding to the link request signal to judge whether it is a signal for operating the IF PBX. By comparing these numbers, the central control unit 419 confirms whether the link request signal is received from a manager terminal installed with the OMS program. Based upon confirmed results, the central control unit 419 controls the switching module 422 to switch the link request signal into the output port.

Upon receiving serial data from the modem 416, the central control unit 419 activates a PPP protocol installed therein. The PPP protocol provides a connection between the modem and the Internet, in the case where the Internet is used with the modem and the SLT line. If the Internet is used as a result of the LAN functioning as a leased line for the Internet, an additional modem is not necessary, thereby eliminating the necessity of a link protocol such as the PPP protocol. In order to manage the IP PBX in the web when the link request signal is transmitted from a modem in the manager terminal across the SLT line, as in the invention, it is therefore necessary to activate the PPP protocol for connecting between the modem and a higher layer, such as a TCP/IP protocol and like or similar applications.

When the PPP protocol is activated, the central control unit 419 carries out a manger authentication procedure, by, for example, referring to a password of the manager, to determine whether to authenticate the IP PBX manager. In order to enable this authentication procedure to take place, when the link request signal is transferred into the IP PBX 400 from the manager terminals 100 and 200, it is preferred to transfer passwords for authentication with the link request signal. When the manager authentication procedure is completed, the central control unit 419 provides the manager terminal 100 or 200 with Internet environments so that the manager may manage the IP PBX.

Figure 3:
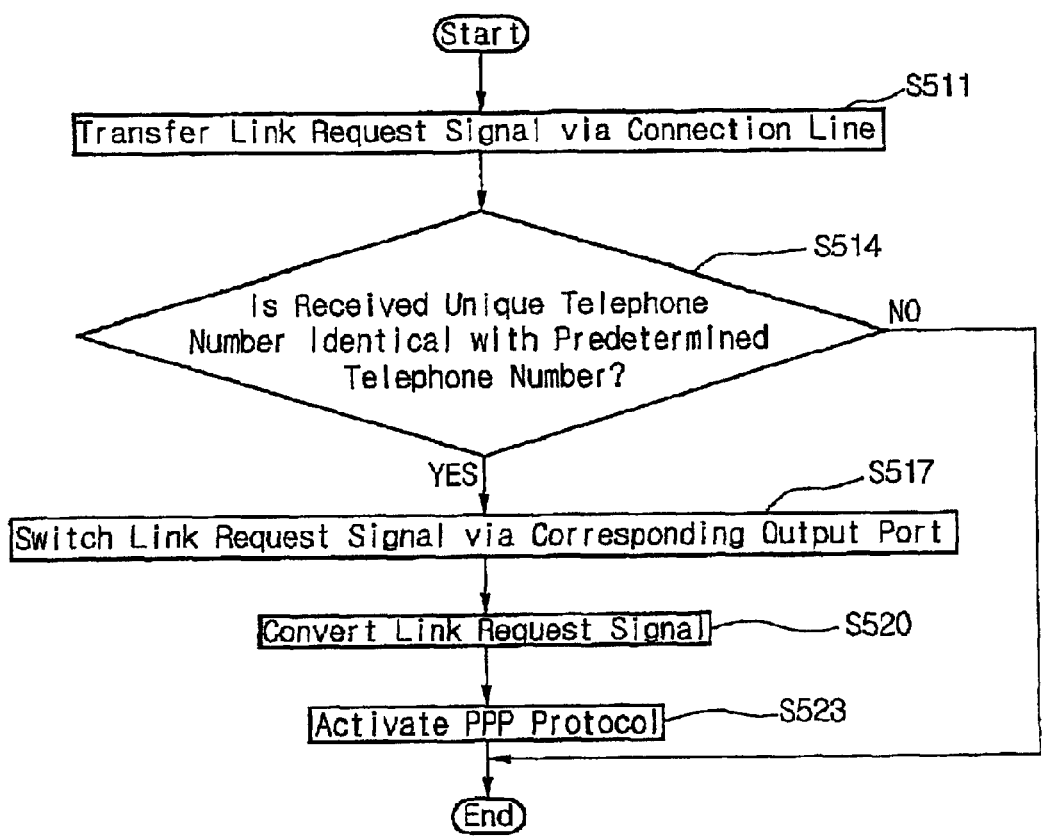
FIG. 3 is a flow chart illustrating an IP PBX connecting process using a manager terminal according to a preferred embodiment of the invention.

FIG. 3 is a flow chart illustrating a method for connecting a manager terminal to an IP PBX according to a preferred embodiment of the invention. First, in order to connect to the IP PBX, a manager sends a link request signal to the IP PBX 400 through a connection line using the manager terminal 100 or 200 installed with the OMS program, in S511. The link request signal may include a unique telephone number and the like. When the link request signal is transferred, a password of the manager is also preferably transferred to the IP PBX 400. The connection line is preferably one of the SLT line 150 and the SLT line 250 connected to the PSTN 300.

Upon receiving the link request signal via the SLT line or the SLT line connected to the PSTN from the manager terminal 100 or 200, the link request signal is reported to the central control unit 419. Any link request signal via the SLT line 150 is received in the SLT interface module 411, and any link request signal via the SLT line 250 connected to the PSTN is received in the public line interface module 413.

When the link request signal is reported, the central control unit 419 loads a pre-stored telephone number and compares that number with the unique telephone number received with the link request signal. The central control unit then confirms whether the unique telephone number is identical with the prearranged telephone number, in S514.

If it is confirmed that the unique telephone number is identical with the prearranged telephone number, the central control unit controls the corresponding link request signal to be switched into the corresponding output port, in S517. The output port is an exclusive port provided in the SLT interface 411 or the public line interface module 413, and is previously allocated for outputting the link request signal via the modem if the link request signal is a request for managing the IP PBX. As a result, if the unique telephone number is identical with the prearranged telephone number, the link request signal switched by the switching module 422 can be directly outputted via the output port.

The link request signal outputted via the output port is converted in the modem 416 so as to be compatible with the central control unit 419, in S520. In other words, the modem 416 demodulates the link request signal modulated with a modem in the manager terminal 100 or 200, so that the link request signal can be recognized by the central control unit 419. The link request signal, e.g., the PCM data, is converted into a serial data in the modem 416.

Next, the central control unit 419 activates an internal PPP protocol in response to the converted link request signal, in S523. Since the PPP protocol functions as a channel connecting between the modem and a TCP/IP protocol, it is necessary to activate the PPP protocol in order to connect the IP PBX with the modem. Of course, in the case of connecting to the IP PBX via the leased Internet line or the LAN, the process directly executes the next step without a step of activating the PPP protocol. In other words, the modem is not necessary if the LAN is used so that the TCP/IP protocol is directly connected to the LAN to transmit/receive information into/from the same. If the PPP protocol is activated, the central control unit 419 carries out the authentication procedure based upon the password of the manager to determine whether to authenticate the manager, and allows the manager to operate the IP PBX by providing an Internet environment according to an authentication result.

The method and apparatus of the present invention are therefore beneficial in a number of respects. For example, through the invention, the manager can connect to the IP PBX via the PSTN using, for example, a household SLT line so as to operate the IP PBX regardless of the location of the manager in relation to the IP PBX. Further, according to the IP PBX connecting method and apparatus of the present invention, the manager can connect to the IP PBX without using the LAN so as to operate the IP PBX regardless of fire walls installed in buildings or companies.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for connecting an IP PBX system to a manager terminal, comprising:

transferring a link request signal from the manager terminal to the IP PBX system over an SLT line;

confirming a source of the link request signal;

if the source of the link request signal is determined to be the manager terminal in said confirming step, switching the link request signal via an exclusive management output port to a modem for performing management operations by the manager terminal; and activating a predetermined protocol to provide an Internet environment to the manager terminal in response to the link request signal.

2. The method according to claim 1, wherein the link request signal has a unique identifier.

3. The method according to claim 1, wherein the confirming step includes judging whether the link request signal has a unique identifier which matches a predetermined identifier.

4. A method for connecting an IP PBX system to a manager terminal, comprising:

transferring a link request signal having a unique identifier from the manager terminal to the IP PBX system via a PSTN;

confirming a source of the link request signal;

if the source of the link request signal is determined to be the manager terminal in the confirming step, switching the link request signal through an exclusive management output port to a modem for performing management operations by the manager terminal; and activating a predetermined protocol to provide an Internet environment to the manager terminal in response to the link request signal.

5. The method according to claim 4, wherein the PSTN is connected to the manager terminal via an SLT line.

6. The method according to claim 4, wherein the confirming step includes judging whether the link request signal has a unique identifier which matches a predetermined identifier.

7. A method for connecting a manager terminal to an IP PBX system, comprising;

generating a management link request signal;

transmitting the management link request signal through a modem of the manager terminal to the IP PBX system over a telephone line;

receiving the link request signal at the IP PBX system and directly transferring the management link request signal via an exclusive management output port to a modem for performing management operations; and receiving information indicating that a connection has been established between the manager terminal and the IP PBX system.

8. The method according to claim 7, wherein the telephone line is an SLT line.

9. The method according to claim 7, wherein the telephone line is an SLT line connected to a public switched telephone network.

10. The method according to claim 7, wherein said transmitting step includes:

transmitting identification information with the management link request signal which validates the management link request signal.

11. The method according to claim 7, wherein said transmitting step includes:

transmitting a password with the management link request signal to confirm an identity of a manager operating the manager terminal.

12. The method of claim 7, further comprising:

transmitting a management command from the manager terminal to the IP PBX system through said connection, said management command instructing the IP PBX system to perform a desired function.

13. The method according to claim 7, further comprising:

receiving Internet access through the connection established between the manager terminal and the IP PBX system.

14. A system for connecting an IP PBX system to a manager terminal, comprising:

an interface module which receives a link request signal from the manager terminal over a telephone line; and a controller which determines whether the link request signal is valid, said controller controlling the interface module to output the link request signal through an exclusive output of the interface module used only when the link request signal is from the manager terminal so as to establish a connection between the IP PBX system and the manager terminal to perform management operations on the IP PBX system.

15. The system according to claim 14, wherein said controller performs management commands received from the manager terminal through said connection.

16. The system according to claim 14, wherein the telephone line is an SLT line.

17. The system according to claim 14, wherein the telephone line is an SLT line connected to a public switched telephone network.

18. The system according to claim 14, wherein the control unit compares identification information in the link request signal to predetermined identification information, and determines that the link request signal is valid if the identification information in the link request signal matches the predetermined identification information.

19. The system according to claim 14, wherein the identification information in the link request signal and the predetermined identification information is a telephone number.

20. The system according to claim 10, wherein said telephone number is a telephone number from which the manager terminal is calling over the telephone line.

21. The system according to claim 14, further comprising:

a modem connected to the exclusive output of the interface module and for establishing the connection between the IP PBX system and the manager terminal.

22. The system according to claim 14, wherein said controller activates a predetermined protocol to provide an Internet environment to the manager terminal after the connection is established.

23. The system according to claim 22, wherein said predetermined protocol is a PPP protocol.

24. The system according to claim 22, wherein the interface module receives a password from the manager terminal over the telephone line, and wherein said controller compares the password to a pre-stored password and performs said activating step if the password and the pre-stored password match.

25. The system according to claim 24, wherein the password is a password of a manager operating said manager terminal.

26. The system according to claim 14, wherein the link request signal is received as a pulse-coded modulation signal.

* * * * *